(12) United States Patent
Ahuja et al.

(10) Patent No.: US 10,732,828 B2
(45) Date of Patent: Aug. 4, 2020

(54) GESTURES USED IN A USER INTERFACE FOR NAVIGATING ANALYTIC DATA

(71) Applicant: SAP SE, Walldorf (DE)

(72) Inventors: Anant Ahuja, New Delhi (IN); Manukumar B, Bangalore (IN); Pooja Bhalla, New Delhi (IN); Roohi Ganatra, Bangalore (IN)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 16/021,323

(22) Filed: Jun. 28, 2018

(65) Prior Publication Data
US 2020/0004412 A1    Jan. 2, 2020

(51) Int. Cl.
| | |
|---|---|
| G06F 3/0481 | (2013.01) |
| G06F 3/0488 | (2013.01) |
| G06F 3/0484 | (2013.01) |
| G06F 3/0485 | (2013.01) |
| G06T 11/20 | (2006.01) |
| G06F 3/0482 | (2013.01) |

(52) U.S. Cl.
CPC ........ G06F 3/04883 (2013.01); G06F 3/0485 (2013.01); G06F 3/04845 (2013.01); G06F 3/0482 (2013.01); G06F 2203/04806 (2013.01); G06F 2203/04808 (2013.01); G06T 11/206 (2013.01)

(58) Field of Classification Search
CPC .... G06F 3/0488; G06F 3/0487; G06F 3/0484; G06F 3/04821; G06T 11/206
See application file for complete search history.

(56) References Cited

U.S. PATENT DOCUMENTS

| | | | | |
|---|---|---|---|---|
| 8,767,019 | B2 * | 7/2014 | Heinrich | G06Q 10/06393 345/661 |
| 10,031,977 | B1 * | 7/2018 | Maycock | G06F 16/24578 |
| 10,121,123 | B1 * | 11/2018 | Gomersall | G06Q 10/1093 |
| 10,339,299 | B1 * | 7/2019 | Magnuson | H04L 9/3247 |
| 2011/0196864 | A1 * | 8/2011 | Mason | G06F 3/0416 707/728 |
| 2012/0221553 | A1 * | 8/2012 | Wittmer | G06F 16/26 707/722 |

(Continued)

FOREIGN PATENT DOCUMENTS

CN            106020484 B   *   3/2019

*Primary Examiner* — Steven P Sax
(74) *Attorney, Agent, or Firm* — Fish & Richardson P.C.

(57) ABSTRACT

The disclosure generally describes methods, software, and systems for providing features in a user interface supporting gestures for navigating analytic data. A client device prepares a presentation including, for each data value, a data value display element and an association between the data value display element and a display location in a display area. User interaction information is received identifying a user interaction with the presentation of the data values and a user interaction location in the display area in which the user interaction occurred. A UI operation is identified to apply to the data values based on associations between the data value display elements and the display location. Identification is based on the received user interaction information. An updated presentation of the data values is prepared using the UI operation on the set of data values. The preparing occurs without obtaining additional data values from a server.

14 Claims, 6 Drawing Sheets

(56) References Cited

U.S. PATENT DOCUMENTS

| | | | | |
|---|---|---|---|---|
| 2012/0259674 A1* | 10/2012 | Cantwell | ............... | G06Q 30/02 |
| | | | | 705/7.29 |
| 2014/0002338 A1* | 1/2014 | Raffa | ................... | G06F 1/1694 |
| | | | | 345/156 |
| 2014/0043325 A1* | 2/2014 | Ruble | ................ | G06F 3/04842 |
| | | | | 345/419 |
| 2014/0304665 A1* | 10/2014 | Holz | ...................... | G06F 3/017 |
| | | | | 715/863 |
| 2014/0354527 A1* | 12/2014 | Chen | ...................... | G06F 3/017 |
| | | | | 345/156 |
| 2015/0346833 A1* | 12/2015 | Jiang | ...................... | G06F 3/017 |
| | | | | 345/158 |
| 2016/0105475 A1* | 4/2016 | Goodman | ............. | G06F 3/0487 |
| | | | | 715/753 |
| 2016/0232457 A1* | 8/2016 | Gray | .................... | G06T 11/206 |
| 2017/0010776 A1* | 1/2017 | Stewart | ................ | G06F 3/0488 |

* cited by examiner

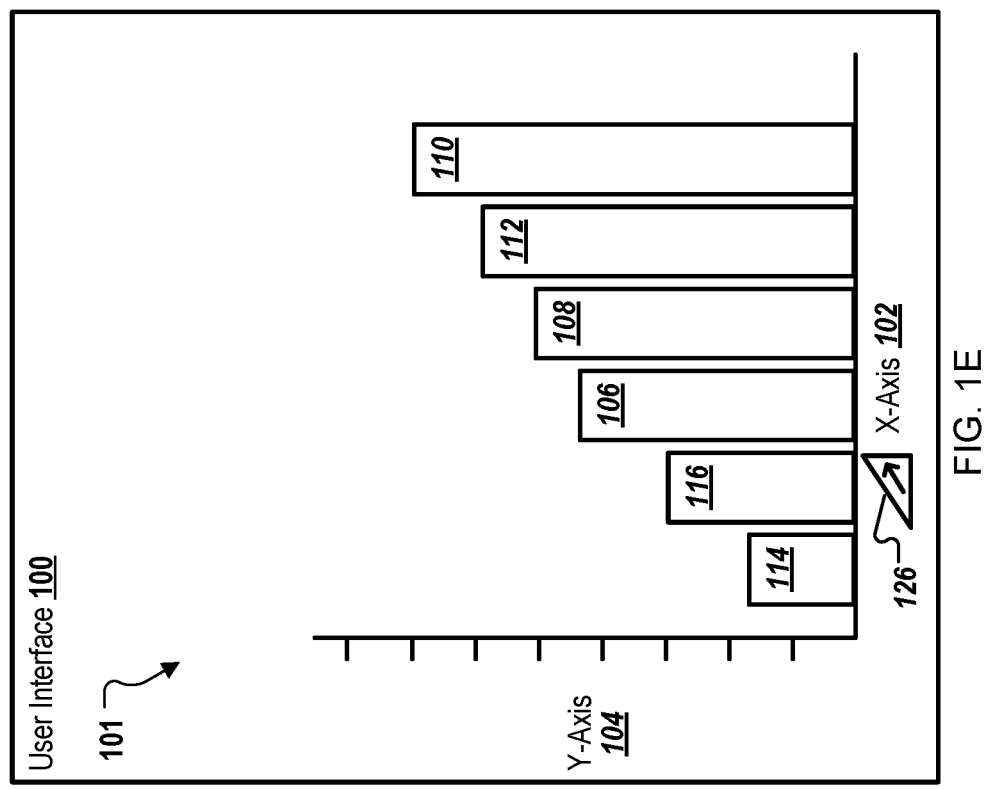

GESTURES USED IN A USER INTERFACE FOR NAVIGATING ANALYTIC DATA

BACKGROUND

The present disclosure relates to features of user interfaces. Innovations in computers and applications are designed to make our lives easier. However, the information that users process using the computers and applications has become more complicated. User interfaces used in day-to-day applications often include features that allow the user to interact with the user interface using a gesture, such as a swipe or a drag-and-drop. However, gestures are not typically supported in enterprise applications, such as applications that users use to interact with large amounts of analytical data. Moreover, mobile devices, because of their limited screen size, can provide challenges for navigating through the analytical data.

SUMMARY

This disclosure generally describes computer-implemented methods, software, and systems for providing features in a user interface supporting gestures for navigating analytic data.

One computer-implemented method includes: receiving, by a client device and from a server, a set of data values; preparing, by the client device for presentation in a display area of a user interface (UI) of the client device, a presentation of the data values having a presentation format type and including, for each data value, a data value display element and an association between the data value display element and a display location in the display area in which the data value display element is presented; providing, by the client device to the UI, the presentation of the data values; receiving, by the client device from the UI, user interaction information identifying a user interaction with the presentation of the data values and a user interaction location in the display area in which the user interaction occurred; identifying, by the client device and based on associations between the data value display elements and the display location in the display area in which the data value display element is included, a UI operation to apply to the data values, the UI operation based on the received user interaction information, the display location in the display area, and the presentation format type; preparing, by the client device for presentation in the UI and using the UI operation on the set of data values, an updated presentation of the data values, the preparing occurring without obtaining additional data values from the server.

The foregoing and other implementations can each optionally include one or more of the following features, alone or in combination. In particular, one implementation can include all the following features:

In a first aspect, combinable with any of the previous aspects, wherein the display location associated with the data value display element is a point, a line, or a region having a location relationship with the data value display element, wherein the user interaction location is defined by a touch screen gesture performed by a user of the UI, and wherein the UI operation is identified at least in part by mapping the user interaction location to display locations of the data value display elements.

In a second aspect, combinable with any of the previous aspects, wherein the UI operations comprise: a compare values UI operation mapped to the user interaction of double-clicking on the display location of a first data value display element and single-clicking on the display location of a second data value display element, wherein the updated presentation includes a presentation of comparative values related to the data values corresponding to the first and second data value display elements; and a multi-value analysis UI operation mapped to the user interaction of double-clicking on the display location of a first data value display element and single-clicking on the display location of at least one second data value display element, wherein the updated presentation includes a presentation of comparative information related to the data value; and wherein single-clicking on a currently-compared data value display element causes removal, from the presentation of the comparative information, the comparative information corresponding to the clicked-on currently-compared data value display element.

In a third aspect, combinable with any of the previous aspects, wherein the UI operations comprise: a filtering UI operation mapped to the user interaction of a drag-off-screen gesture; wherein the updated presentation includes a removal of the data value display element from the presentation of the data elements, and wherein the presentation of data elements includes a filtered-out control configured to list and permit re-instatement of filtered-out data value display elements; a show values UI operation mapped to the user interaction of a long press touch within the display location, wherein the updated presentation includes a presentation of one or more values associated with the data value; a navigation from values UI operation mapped to the user interaction of a tap and hold, wherein the updated presentation includes a presentation of addition information related to the data value; and a sorting UI operation mapped to the user interaction of swiping on an axis of a chart to sort the data value display elements; wherein the updated presentation includes sorting the data value display elements in an ascending order or a descending order depending on a direction of the swiping along the axis.

In a fourth aspect, combinable with any of the previous aspects, wherein the UI operations comprise: a zoom in UI operation mapped to the user interaction of an outward pinching gesture, wherein the updated presentation includes a zoomed-in presentation of the one or more data value display elements; a zoom out UI operation mapped to the user interaction of an inward pinching gesture, wherein the updated presentation includes a zoomed-out presentation of the one or more data value display elements; and a scroll UI operation mapped to the user interaction of a drag gesture, wherein the updated presentation includes a scrolled repositioning of the one or more data value display elements.

In a fifth aspect, combinable with any of the previous aspects, wherein the data value display element is a segment of a pie chart that presents a set of data value display elements as sectors proportioned to sum to 360 degrees of the pie chart, wherein a first user interaction location is an invisible scrollable location on the pie chart, wherein the user interaction for interacting with the pie chart is scrolling the invisible scrollable location on the pie chart; wherein the scrolling causes a rotational repositioning of the pie chart so that a user-selected segment is positioned at the top of the pie chart and a pie chart data value display element displays information for the user-selected segment that is currently positioned at the top of the pie chart, and wherein the user-selected segment is further selectable using a user selection from a legend of segments of the pie chart.

In a sixth aspect, combinable with any of the previous aspects, wherein statistical information presented for the UI operation changes depending on a number of values to which the UI operation applies.

In a seventh aspect, combinable with any of the previous aspects, wherein user interactions result in different UI operations depending on the presentation format type.

In an eighth aspect, combinable with any of the previous aspects, wherein presentation format types comprise pie charts, histograms, line graphs, and bar graphs.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 1E is a screen shot of the user interface with the graph in a sorted state.

DETAILED DESCRIPTION

Figure 1B:
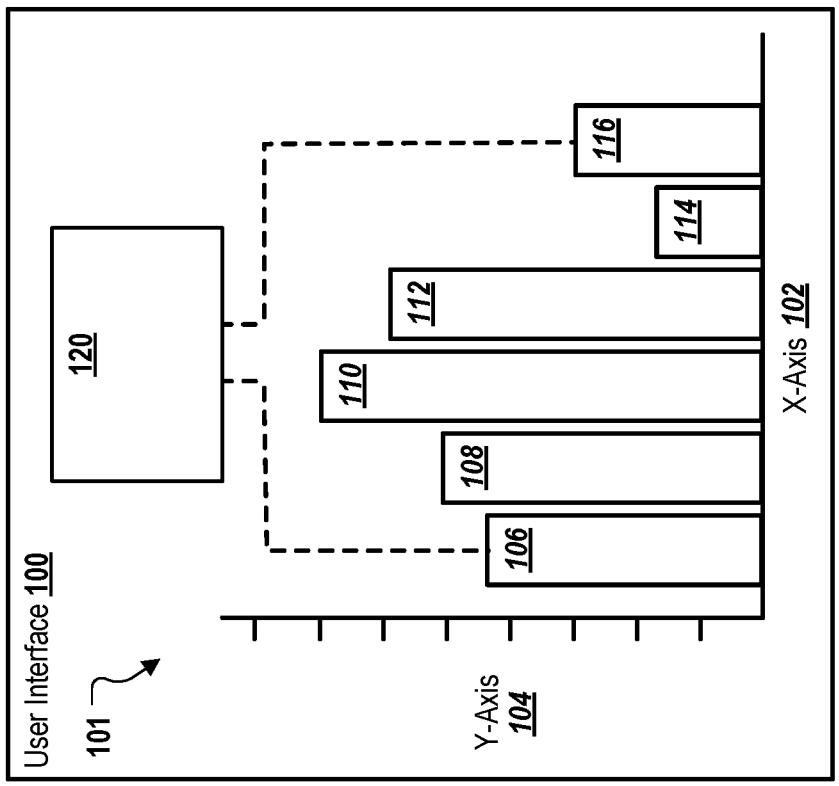
FIG. 1B is a screen shot of the user interface during a compare values UI operation.

This disclosure generally describes computer-implemented methods, software, and systems for providing features in a user interface (UI) supporting gestures for navigating analytic data.

Modern day computing has inspired innovations that are designed to make lives simpler and make work go faster. The innovations can be in the form of hardware, software, engineering, art, and design. A given innovation may cater to a small aspect that is part of a larger application. Innovations can support the use of various type of computers, including handheld devices, desktop computers, and laptop computers. Mobile devices, including smartphones, are in widespread use today and have been the target of innovation in terms of applications and cutting-edge technology. For example, innovations can include UI features that support the use of gestures made by a user within a UI. The support of gestures can be enabled using a touchscreen that recognizes points of contact with the surface of the touchscreen, and each gesture can be interpreted using algorithms to interpret the user's intent and perform a specified UI operation. As a result, a user can use of gestures (with other actions) to control, communicate, and interact with the devices in a natural an intuitive way.

Although the use of gestures in UIs is widely available in many day-to-day applications (for example, consumer applications), the use of gestures in UIs has not reached enterprise resource planning (ERP)-based applications. Such innovations can allow employees and users to become more mobile and use more touch-based devices, allowing work to be completed more efficiently. The use of gestures in UIs that present analytical data can provide faster access to insights and information. This can allow users to solve time-based and interaction-based problems, achieve quicker insights, and make faster and more intelligent decisions. The use of gestures in UIs can be especially useful for the users working with reports and charts.

Advantages of using the features of UI gestures and associated UI operations can include the following. First, gestures can be leveraged for different features in analytical applications, making the user experience more intuitive and pleasing. Second, the use of UI gestures can facilitate faster accessibility of different data sets (or changing data sets) in the same report (such as a chart). Third, users can learn and become accustomed to outcomes with respect to gestures (which can become consistent and uniform across platforms). For example, the user will learn what to expect when a particular gesture is performed. Some expectations can be readily apparent from the user's knowledge of non-analytical applications, for example, knowing to expect that a pinch in and out results in a zoom in and out. Fourth, the features of UI gestures and associated UI operations can eliminate or reduce restrictions with features that are available on desktop and laptop implementations. This can allow UI gestures to be available across all touch devices and offered on all analytical features. Fifth, the features of UI gestures and associated UI operations can reduce the number of clicks and interactions that otherwise may be needed with respect to use of icons and hyperlinks. Sixth, the features of UI gestures and associated UI operations can result in faster response times for all business roles, increased user productivity, increased user agility, simplified processes, and faster time to market. Seventh, access to detailed insights and information can be available in one place without needing to access other platforms or tools. Eighth, users can make faster insights using the information. Ninth, users can have the flexibility to select multiple discrete points for analysis (or combinations of values). Tenth, all relevant information can be available in graphical representation so the user does not have to switch between different sources or views of the data.

As users become more proficient and accustomed to the use of gestures, a level of self-learning can be achieved. If the handling of gestures is uniform and consistent, then the functionality can be used across devices, which can improve the user's productivity.

For example, if a user is viewing extreme values in a column chart with barely-visible bars on the x-axis (because the mapped data includes a low value), the information can be illegible and can frustrate the user. Even if the bars are visible, possibilities exist for overlapping or clashing of data, which can make the information unreadable. When such information is unusable, users can be forced to export information in the report to external formats and devote additional time to finding the right information or insight. In some implementations, features of the UI can include the use of gestures by which the user can more easily navigate the information.

Features and functionalities of an application can be supported by gestures that users can use when interacting with the application. Each of the features and functionalities can have a dedicated gesture that is available on touchscreen device to make UI operations on charts simpler and faster to use. In some implementations, the same dedicated gestures can be supported in non-touchscreen scenarios, such as by providing the same or similar features and functionalities that are accessed using a mouse or other type of peripheral or control. In this way, all users can use gestures for interacting with charts and analytical data in their day-to-day operations. Gestures (or touchscreen actions) can include, for example, a tap, a tap and hold (or "long press"), a pinch (including inward and outward pinching, a swipe, a double tap, a force touch (in some devices), multi-touch gestures (including combinations of swipe up, swipe one way, and pinch), and drag (or hold and drag), among others. The location on a screen in which the gesture was used can determine the user's intent and can identify the UI operation to be performed.

In some implementations, different interpretations of gestures can occur based on a speed at which a given gesture occurs. For example, two single taps that occur within a threshold time can be interpreted as a double-click. In some implementations, user settings or preferences can be set by a user to define the intended meaning of particular gestures, including time or speed settings that may apply (for example, to indicate a double-click).

In some implementations, a set of data values that is to be presented to a user can be received by a client device, such as from a particular server from a cloud-based application or data source, or from a web-based application. The client device can prepare a presentation of the data values for presentation in a display area of the UI of the client device. The presentation of the data values can have a presentation format type, such as various types of pie charts, histograms, line graphs, and bar graphs. For each data value, the client device can generate a data value display element and can define an association between the data value display element and a display location in the display area in which the data value display element is presented. For example, the display location associated with the data value display element can be a point, a line, or a region having a location relationship with the data value display element.

The client device can provide the presentation of the data values to the UI. After user interaction with the UI, the client device can receive, from the UI, user interaction information identifying a user interaction with the presentation of the data values and a user interaction location in the display area in which the user interaction occurred. For example, the user interaction location can be defined by a touch screen gesture performed by a user of the UI. Based on associations between the data value display elements and the display location in the display area in which the data value display element is included, the client device can identify a UI operation to apply to the data values. For example, the UI operation can be identified at least in part by mapping the user interaction location (e.g., a location at which a particular interaction begins or ends, such as a point at which a user's finger, stylus, or other touching mechanism makes contact with a touch display) to display locations of the data value display elements. Identifying the UI operation can be based on the received user interaction information, the display location in the display area, and the presentation format type.

Once the UI operation is identified, the client device can use the UI operation on the set of data values to prepare, for presentation in the UI, an updated presentation of the data values, the preparing occurring without obtaining additional data values from the server. In some implementations, the following features and associated UI operations can be supported.

Figure 1A:
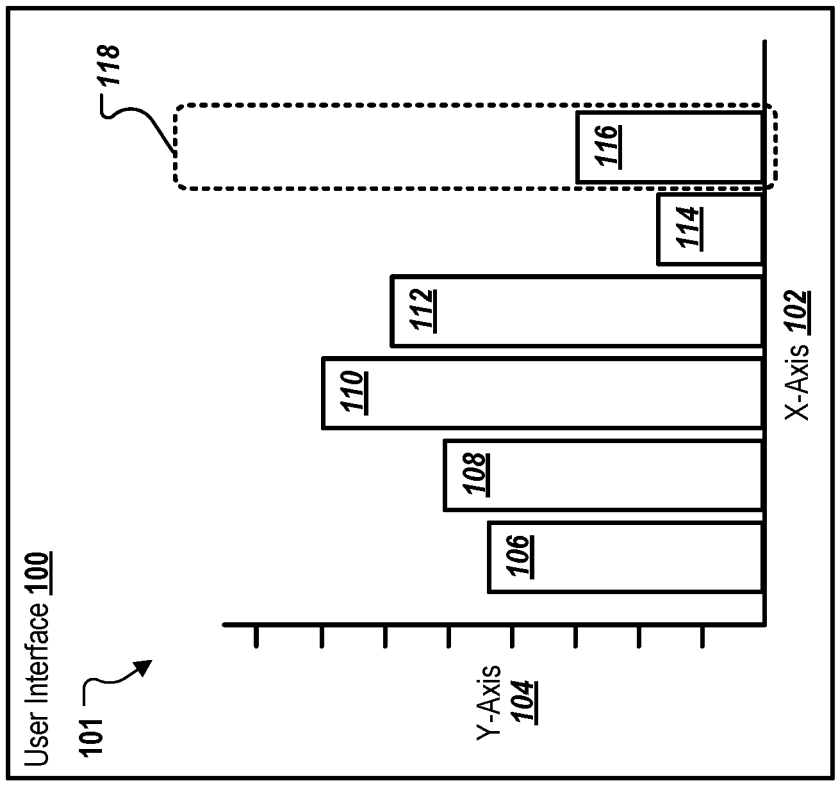
FIG. 1A is a screen shot of an example of a user interface for presenting data values associated with analytical information.

FIG. 1A is a screen shot of an example of a user interface 100 for presenting data values associated with analytical information. The UI 100 can present a graph 101 that includes an x-axis 102 and a y-axis 104. Data value display elements 106-116 corresponding to data values of the analytical information can be plotted on the graph 101 relative to the x-axis 102 and the y-axis 104, as shown in FIG. 1A. A user using a client device that presents the UI 100 can view and interact with the graph 101 in various ways, including using gestures. For example, one or more gestures that are available for use in interacting with the graph 101 can rely on the existence of a sweet spot 118 that includes (or serves as a display location for) the data value display element 116. A user can perform a gesture having an user interaction location that is inside (or overlaps with) the sweet spot 118. An application (for example, that serves the analytical data) currently running on the client can then interpret the gesture and perform a corresponding UI operation, such as to update the presentation of the analytical data. Multiple sweet spots 118 can exist for a given data value display element and can have different results based on a location relative to the given data value display element. For example, a user interaction inside a sweet spot above a given bar (for example, above the data value display elements 106-116) can have a different result from a user interaction in a sweet spot inside the given bar. An advantage of the sweet spot 118 is that the user can slide through areas of the UI and see all the values including the values that are too small or are not otherwise visible.

Various types of sweet spots can exist. For example, the sweet spot for a particular data value display element can be a region that includes, or is adjacent to, the particular data value display element. For a bar in a bar chart, for example, the sweet spot can include the bar itself, a region above the bar that is approximately the width of the bar, or both. A sweet spot for an axis, for example, can include the line that is displayed for the axis, an area that includes the title of the axis, or both.

A compare values UI operation can be mapped to the user interaction of double-clicking on the display location of a first data value display element and single-clicking on the display location of a second data value display element. The updated presentation can include a presentation of comparative values related to the data values corresponding to the first and second data value display elements. For example, a double tap can be used for entering a mode for comparing values. Upon entering the mode, selection of additional values can be made with a single tap. Exiting from the mode can be done using a double tap.

FIG. 1B is a screen shot of the user interface 100 during a compare values UI operation. A value comparison area 120 can appear, for example, upon double-clicking by the user on a sweet spot for the data value display element 106, followed by a single click on the data value display element 116.

A multi-value analysis UI operation can be mapped to the user interaction of double-clicking on the display location of a first data value display element and single-clicking on the display location of at least one second data value display element. The updated presentation can include a presentation of comparative information related to the data value. After that, single-clicking on a currently-compared data value display element can cause exclusion, from the presentation of the comparative information, of the comparative information corresponding to the clicked-on currently-compared data value display element.

Figure 1D:
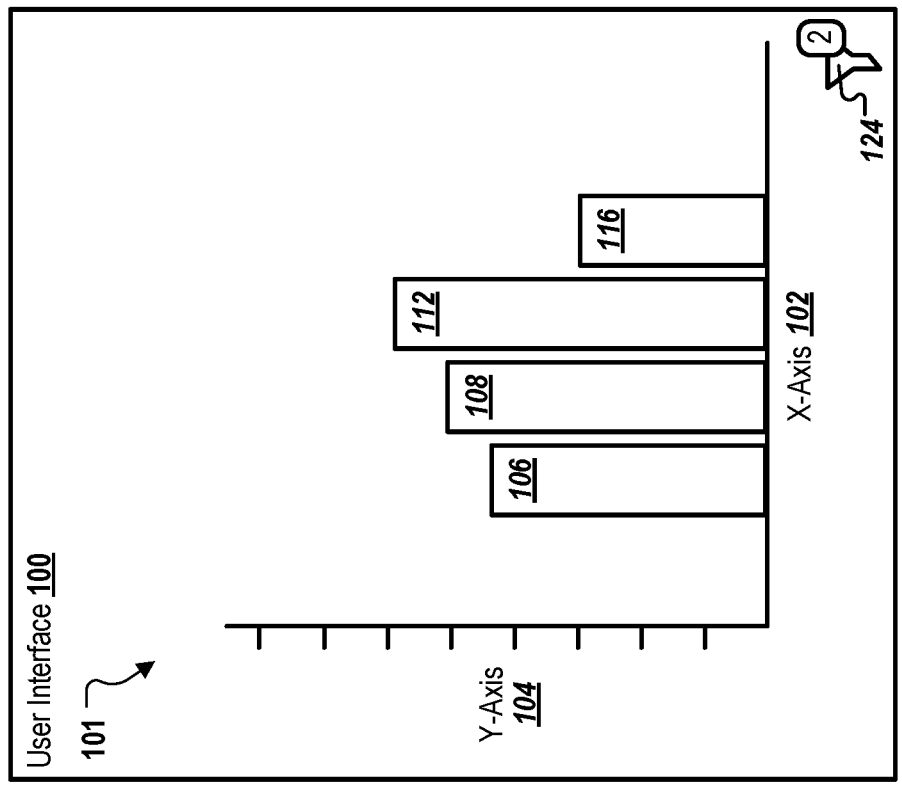
FIG. 1D is a screen shot of the user interface with the graph in a filtered state.
Figure 1C:
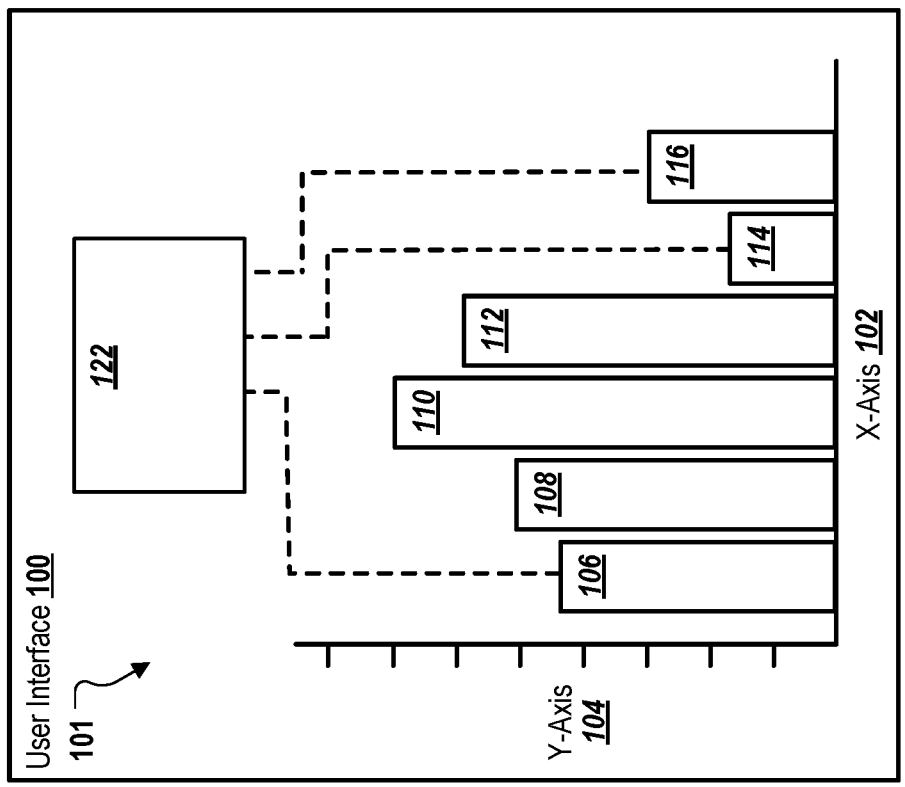
FIG. 1C is a screen shot of the user interface during a multi-value analysis UI operation.

FIG. 1C is a screen shot of the user interface 100 during a multi-value analysis UI operation. A multi-value analysis area 122 can appear, for example, upon double-clicking by the user on a sweet spot for the data value display element 106, followed by a single click on the data value display elements 114 and 116.

In some implementations, the type and scope of statistical information presented for the UI operation can change depending on a number of values to which the UI operation applies. For example, when just two data elements are being compared, an average of the data elements can be provided. When more than two data elements are being compared, additional information that is provided can include standard deviation information.

A filtering UI operation can be mapped to the user interaction of a drag-off-screen gesture. The updated presentation can include a removal of the data value display element from the presentation of the data elements. The presentation of data elements can include a filtered-out control configured to list and permit re-instatement of filtered-out data value display elements. For example, a drag (or hold and drag) that ends in an upward drag, when used on a particular chart element such as a bar graph, can exclude the element from the filter.

FIG. 1D is a screen shot of the user interface 100 with the graph 101 in a filtered state. For example, data value display elements 106, 108, 112, and 116 remain displayed in the graph 101 after data value display elements 110 and 114 have been filtered out. A filter icon 124 can be displayed in the user interface 100 whenever one or more data value display elements have been filtered out. The filter icon 124 can include a visible count of the number of filtered-out elements. User selection of the filter icon 124 can result in a displayed list of the filtered-out elements and controls for restoring selected ones of the elements to the graph 101.

A show values UI operation can be mapped to the user interaction of a long press touch within the display location. The updated presentation can include a presentation of one or more values associated with the data value. For example, a single tap can result in the display of values, such as done in drill-down scenarios. Further, holding the value and swiping can allow the user to see other values, eliminating the need to tap for each value. The show values UI operation can be used in pie charts, histograms, line graphs, bar graphs, and other types of presentations.

A navigation from values UI operation can be mapped to the user interaction of a tap and hold (or by a double click). The updated presentation can include a presentation of addition information related to the data value.

Long pressing on any value can invoke options for any navigation targets available for that particular value.

A sorting UI operation can be mapped to the user interaction of swiping on an axis of a chart to sort the data value display elements. The updated presentation can include sorting the data value display elements in an ascending order or a descending order, depending on a direction of the swiping along an axis. The sorting UI operation can be initiated, for example, by swiping along the axis. Swiping from lower to higher values can cause the sort to be in ascending order. Otherwise, swiping from higher to lower values can cause the sort to be in descending order.

FIG. 1E is a screen shot of the user interface 100 with the graph 101 in a sorted state. For example, data value display elements 106-116 are displayed in the graph 101 in an ascending order of value relative to the y-axis 104. In some implementations, a sorted state indicator 126 can be displayed in the user interface 100 whenever the data value display elements are currently displayed in a sorted state. The sorted state indicator 126 can be used, upon selection by the user, to restore the graph 101 to an un-sorted state. Gestures can also be used for this purpose, for example, by performing a user interaction (such as a single click) on a given one of the axes.

A zoom in UI operation can be mapped to the user interaction of an outward pinching gesture. The updated presentation can include a zoomed-in presentation of the one or more data value display elements. Further, a zoom out UI operation can be mapped to the user interaction of an inward pinching gesture. The updated presentation can include a zoomed-out presentation of the one or more data value display elements. In some implementations, one or more carousels or other controls can be provided at the bottom of the UI 100 so that user can pan through sections of a magnified chart.

A scroll UI operation can be mapped to the user interaction of a drag gesture. The updated presentation can include a scrolled repositioning of the one or more data value display elements. For example, the scroll UI operation can be used in an active carousel during a zoom-in state of a current display, with the scrolling being activated by swiping with one finger.

In some implementations, user interactions can result in different UI operations depending on the presentation format type. For example, a swipe made along an axis can indicate that the data values plotted relative to the axis are to be sorted, while a swipe of a data value display element towards the top of the screen can indicate that the corresponding data value is to be filtered out.

In some implementations, the use of gestures in the UI can support the presentation of, and interaction with, pie charts. For example, the data value display element can be a segment of a pie chart that presents a set of data value display elements as sectors proportioned to sum to 360 degrees of the pie chart. A first user interaction location can be an invisible scrollable location on the pie chart. The user interaction for interacting with the pie chart can include scrolling the invisible scrollable location on the pie chart. The scrolling can cause a rotational repositioning of the pie chart so that a user-selected segment is positioned at the top of the pie chart. A pie chart data value display element can display information for the user-selected segment that is currently positioned at the top of the pie chart. In some implementations, the user-selected segment can further be selectable using a user selection from a legend identifying segments of the pie chart.

Figure 2A:
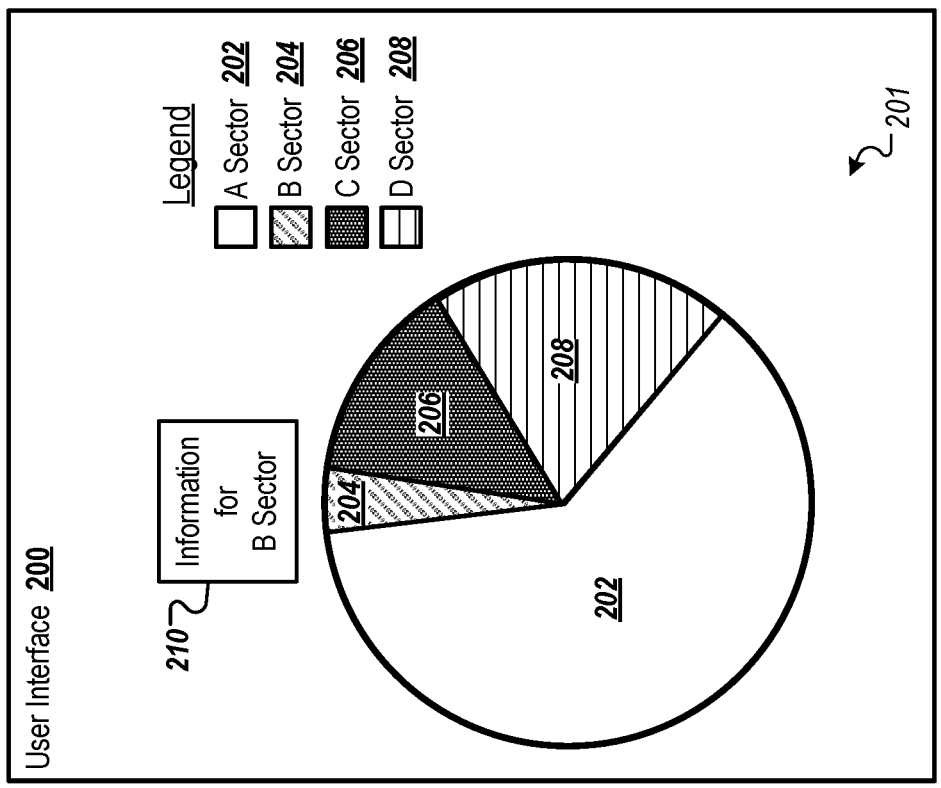
FIG. 2A is a screen shot of an example of a user interface for presenting data values in a pie chart.

FIG. 2A is a screen shot of an example of a user interface 200 for presenting data values in a pie chart 201. The pie chart 201 can include sectors 202-208. Initially, when the pie chart 201 is presented, the A sector 202 can be presented in a top portion of the pie chart 201. Depending on whatever sector 202-208 is presently located at the top of the pie chart 201, an information area 210 can display detailed information for that top-located sector. A legend 210 can list the sectors and can include annotations of the sectors matching the annotations of the corresponding sectors 202-208. Although the annotations for the sectors are shown in FIG. 2A as various types of shading, other implementations can use color-coding of the sectors. An invisible control 214, representing various locations on the pie chart 201, can be used by the user to spin the pie chart 201 so that other sectors 204-208 can be rotated into position under (and cause an update to) the information area 210.

Figure 2B:
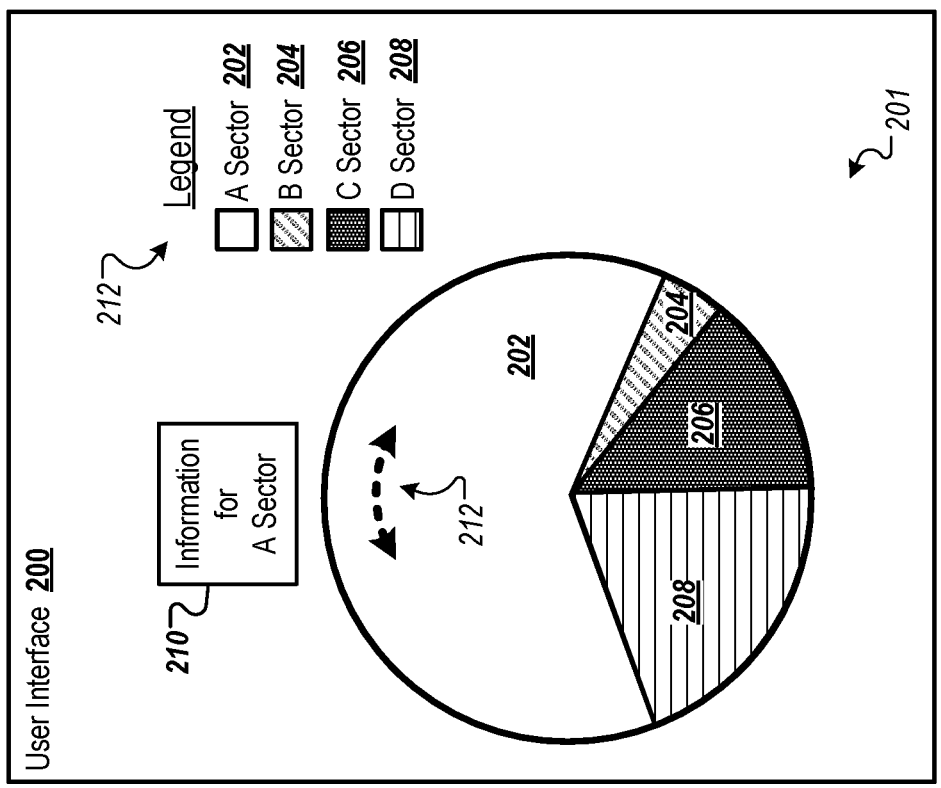
FIG. 2B is a screen shot of the user interface in which the pie chart has been rotated to cause a different value from the pie to be displayed.

FIG. 2B is a screen shot of the user interface 200 in which the pie chart 201 has been rotated to cause a different value from the pie to be displayed. For example, since the B sector 204 has been rotated into position under the information area 210, detailed information for the B sector is displayed. In some implementations, other controls and gestures can be provided for comparing or manipulating two or mode sectors in the pie chart 201.

In some implementations, gestures can be extended to other actions and features. For example, a long press and other features can also be used for report-to-report navigation (RRN).

In some implementations, multi-value data analysis can include values such as sum, average, mean, variance deviation, contribution of a top N elements, contribution of a bottom M elements, a count of values above average, a count of values below average, and custom formulas that can be developed to provide specialized information.

Figure 3:
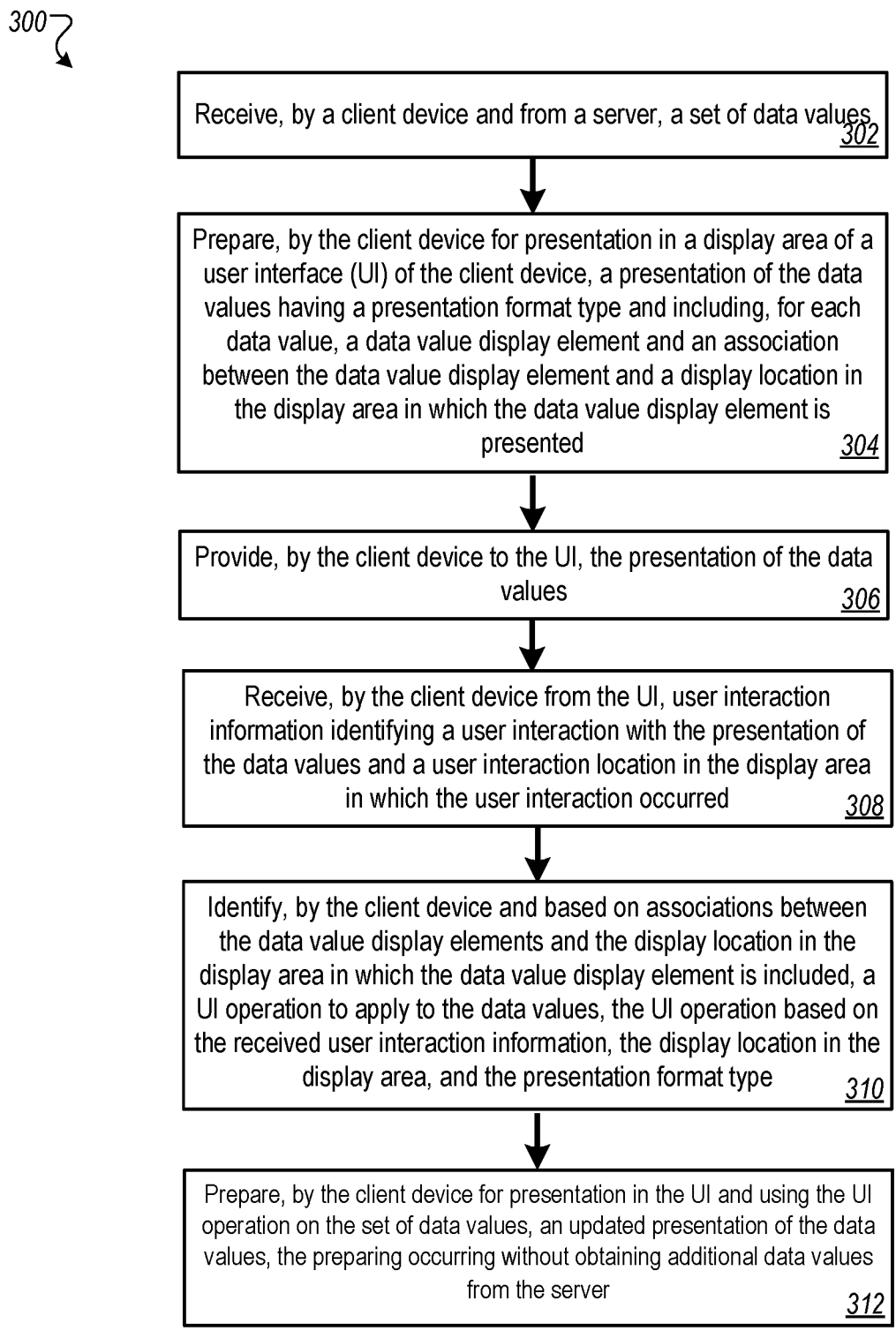
FIG. 3 is a flowchart of an example method for handling gestures in a user interface.

FIG. 3 is a flowchart of an example method 300 for handling gestures in a user interface. Method 300 can be performed by the client device and applications that present the UI 100. For clarity of presentation, the description that follows generally describes method 300 in the context of FIGS. 1A-2B.

At 302, a set of data values that is to be presented to a user can be received by a client device and from a server, such as from the Cloud. For example, a client device in use by the user and that supports the UI 100 can receive analytical information associated with the data value display elements 106-116.

At 304, a presentation of the data values is prepared by the client device for presentation in a display area of the UI of the client device. The presentation of the data values includes a presentation format type, such as various types of pie charts, histograms, line graphs, and bar graphs. For each data value, the client device can generate a data value display element and defines an association between the data value display element and a display location in the display area in which the data value display element is presented. For example, the display location associated with the data value display element can be a point, a line, or a region having a location relationship with the data value display element. The display location of a line graph, for example, can be an area that includes and surrounds the line. The display location of a bar in a bar chart, for example, can be the bar itself. The display location of a sector of a pie chart, for example, can be the region defined by the sector. The display location for a stacked bar can be an area of the bar. The UI 100 can present the graph 101 that includes the data value display elements 106-116 corresponding to data values of the analytical information presented to the user. Each data value can be represented by a particular one of the data value display elements 106-116, each having a display location and with a sweet spot such as the sweet spot 118 for the data value display element 116.

At 306, the presentation of the data values is provided by the client device to the UI. For example, the UI 100 can present the graph 101 that includes the data value display elements 106-116.

At 308, user interaction information identifying a user interaction with the presentation of the data values and a user interaction location in the display area in which the user interaction occurred are received by the client device from the UI. For example, after user interaction with the UI, the client device can receive, from the UI, user interaction information identifying a user interaction with the presentation of the data values and a user interaction location in the display area in which the user interaction occurred. For example, the user interaction location can be defined by a touch screen gesture performed by a user of the UI 100.

At 310, based on associations between the data value display elements and the display location in the display area in which the data value display element is included, a UI operation to apply to the data values is identified by the client device. For example, the UI operation can be identified, at least in part, by mapping the user interaction location to display locations of the data value display elements. Identifying the UI operation can be based on the received user interaction information, the display location in the display area, and the presentation format type. For example, the user can double-click on a sweet spot for the data value display element 106 and then single-click on the sweet spot 118 for the data value display element 116. Then, an application supporting the UI 100 can determine that the pertinent UI operation is a compare values UI operation.

At 312, (once the UI operation is identified) an updated presentation of the data values is prepared by the client device for presentation in the UI. The updated presentation of the data values can be prepared using the UI operation on the set of data values. The preparing can occur without obtaining additional data values from the server. As an example, the UI 100 can prepare a new presentation that includes the value comparison area 120. The new presentation can access and include information already stored at the client device that has been mapped to the data value display elements. For a show values UI operation, for example, information already stored at the client device can include data that is associated with the underlying data values. As a result, the selection of a particular point in the UI can provide corresponding drill-down information. The associations can be made, for example, using one or more of metadata and identifiers associated with the data. When the set of data values is to be presented to a user are received at 302, the received information can include a superset of the values that are initially presented at 306. The data values can remain stored at the client device until a time at which they are needed. In a process for comparing data points, the UI can use a first selection as a primary data point and subsequent selections as secondary data points. For example, referring to FIG. 1B, if the data value display element 106 is selected first followed by selection of the data value display element 110, then a difference generated from the data value display elements will be negative, while the reverse order of selection will produce a positive difference.

Figure 4:
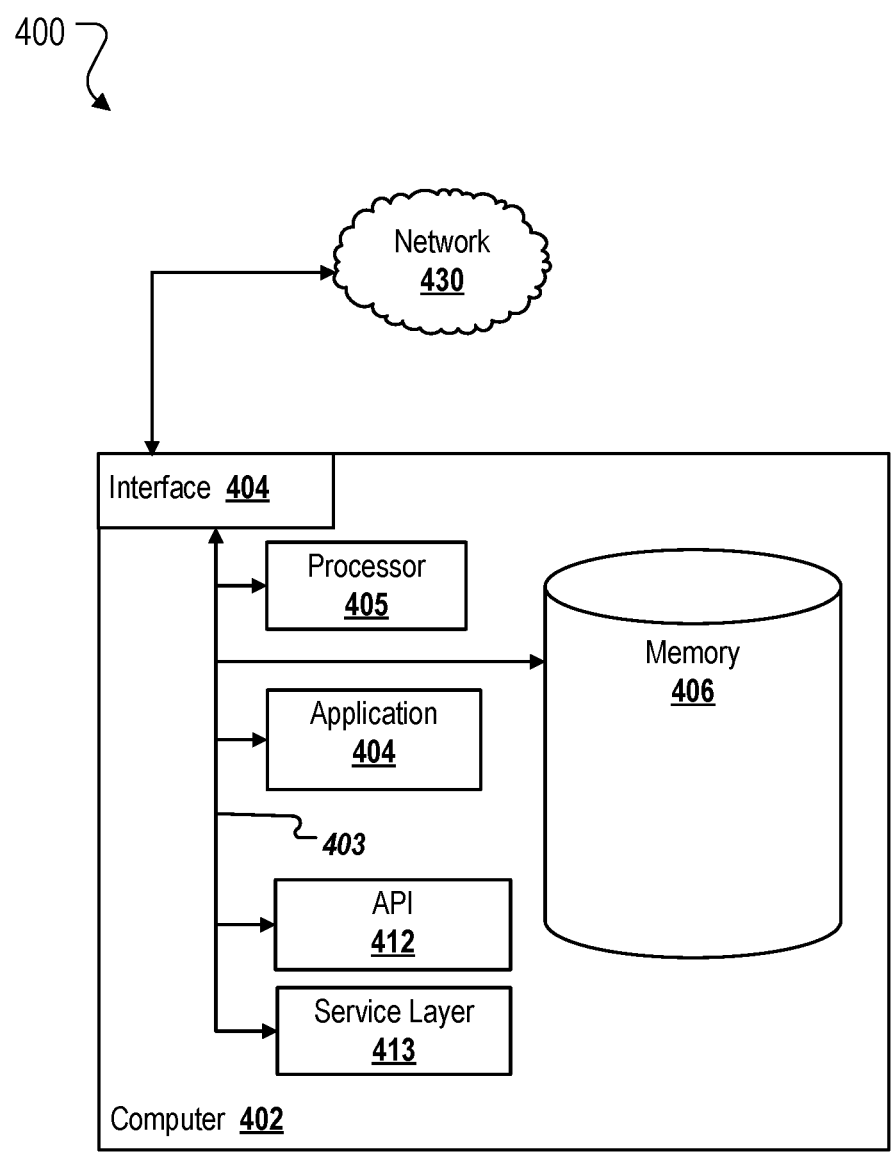
FIG. 4 is a block diagram of an exemplary computer system used to provide computational functionalities associated with described algorithms, methods, functions, processes, flows, and procedures as described in the instant disclosure.

FIG. 4 is a block diagram of an exemplary computer system 400 used to provide computational functionalities associated with described algorithms, methods, functions, processes, flows, and procedures as described in the instant disclosure.

The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an API 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of the instant disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430 (whether illustrated or not). For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a GUI. The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving, by a mobile device and from a server, a set of data values;
preparing, by the mobile device for presentation in a display area of a touchscreen user interface (UI) of the mobile device, a presentation of the data values having a presentation format type and including, for each data value, a data value display element and an association between the data value display element and a display location in the display area in which the data value display element is presented, wherein the data value display element is a segment of a pie chart that presents a set of data value display elements as sectors proportioned to sum to 360 degrees of the pie chart;
providing, by the mobile device to the UI, the presentation of the data values;
receiving, by the mobile device from the UI, user interaction information identifying a user interaction with the presentation of the data values and a user interaction location in the display area in which the user interaction occurred, wherein the user interaction location is an invisible scrollable location on the pie chart, wherein the user interaction for interacting with the pie chart is scrolling the invisible scrollable location on the pie chart, and wherein the scrolling causes a rotational repositioning of the pie chart so that a user-selected segment is positioned at the top of the pie chart and a pie chart data value display element displays information for the user-selected segment that is currently positioned at the top of the pie chart;
identifying, by the mobile device and based on associations between the data value display elements and the display location in the display area in which the data value display element is included, a UI operation from a plurality of UI operations to apply to the data values, the UI operation based on the received user interaction information, the display location in the display area, and the presentation format type; and
preparing, by the mobile device for presentation in the UI and using the UI operation on the set of data values, an updated presentation of the data values, the preparing occurring without obtaining additional data values from the server, wherein the UI operations comprise:
a compare values UI operation mapped to the user interaction of double-clicking on the display location of a first data value display element and single-clicking on the display location of a second data value display element, wherein the updated presentation includes a presentation of comparative values related to the data values corresponding to the first and second data value display elements;
a multi-value analysis UI operation mapped to the user interaction of double-clicking on the display location of a first data value display element and single-clicking on the display location of at least one second data value display element, wherein the updated presentation includes a presentation of comparative information related to the data value, and wherein single-clicking on a currently-compared data value display element causes removal, from the presentation of the comparative information, the comparative information corresponding to the clicked-on currently-compared data value display element;

a filtering UI operation mapped to the user interaction of a drag-off-screen gesture, wherein the updated presentation includes a removal of the data value display element from the presentation of the data elements, and wherein the presentation of data elements includes a filtered-out control configured to list and permit re-instatement of filtered-out data value display elements;

a show values UI operation mapped to the user interaction of a long press touch within the display location, wherein the updated presentation includes a presentation of one or more values associated with the data value;

a navigation from values UI operation mapped to the user interaction of a tap and hold, wherein the updated presentation includes a presentation of addition information related to the data value; and a sorting UI operation mapped to the user interaction of swiping on an axis of a chart to sort the data value display elements, wherein the updated presentation includes sorting the data value display elements in an ascending order or a descending order depending on a direction of the swiping along the axis.

2. The computer-implemented method of claim 1, wherein the display location associated with the data value display element is a point, a line, or a region having a location relationship with the data value display element, wherein the user interaction location is defined by a touch screen gesture performed by a user of the UI, and wherein the UI operation is identified at least in part by mapping the user interaction location to display locations of the data value display elements.

3. The computer-implemented method of claim 1, wherein the UI operations comprise:

a zoom in UI operation mapped to the user interaction of an outward pinching gesture, wherein the updated presentation includes a zoomed-in presentation of the one or more data value display elements;

a zoom out UI operation mapped to the user interaction of an inward pinching gesture, wherein the updated presentation includes a zoomed-out presentation of the one or more data value display elements; and a scroll UI operation mapped to the user interaction of a drag gesture, wherein the updated presentation includes a scrolled repositioning of the one or more data value display elements.

4. The computer-implemented method of claim 1, wherein the user-selected segment is further selectable using a user selection from a legend of segments of the pie chart.

5. The computer-implemented method of claim 1, wherein statistical information presented for the UI operation changes depending on a number of values to which the UI operation applies.

6. The computer-implemented method of claim 1, wherein user interactions result in different UI operations depending on the presentation format type.

7. The computer-implemented method of claim 1, wherein presentation format types comprise pie charts, histograms, line graphs, and bar graphs.

8. A system comprising:

memory storing information mapping user interface display locations of displayed data value display elements to underlying data values corresponding to the displayed data value display elements; and a mobile device performing operations comprising:

receiving, from a server, a set of data values;

preparing, for presentation in a display area of a touch-screen user interface (UI) of the mobile device, a presentation of the data values having a presentation format type and including, for each data value, a data value display element and an association between the data value display element and a display location in the display area in which the data value display element is presented, wherein the data value display element is a segment of a pie chart that presents a set of data value display elements as sectors proportioned to sum to 360 degrees of the pie chart;

providing, to the UI, the presentation of the data values;

receiving, from the UI, user interaction information identifying a user interaction with the presentation of the data values and a user interaction location in the display area in which the user interaction occurred, wherein the user interaction location is an invisible scrollable location on the pie chart, wherein the user interaction for interacting with the pie chart is scrolling the invisible scrollable location on the pie chart, and wherein the scrolling causes a rotational repositioning of the pie chart so that a user-selected segment is positioned at the top of the pie chart and a pie chart data value display element displays information for the user-selected segment that is currently positioned at the top of the pie chart;

identifying, based on associations between the data value display elements and the display location in the display area in which the data value display element is included, a UI operation from a plurality of UI operations to apply to the data values, the UI operation based on the received user interaction information, the display location in the display area, and the presentation format type, wherein the UI operations comprise:

a compare values UI operation mapped to the user interaction of double-clicking on the display location of a first data value display element and single-clicking on the display location of a second data value display element, wherein the updated presentation includes a presentation of comparative values related to the data values corresponding to the first and second data value display elements;

a multi-value analysis UI operation mapped to the user interaction of double-clicking on the display location of a first data value display element and single-clicking on the display location of at least one second data value display element, wherein the updated presentation includes a presentation of comparative information related to the data value, and wherein single-clicking on a currently-compared data value display element causes removal, from the presentation of the comparative information, the comparative information corresponding to the clicked-on currently-compared data value display element;

a filtering UI operation mapped to the user interaction of a drag-off-screen gesture, wherein the updated presentation includes a removal of the data value display element from the presentation of the data elements, and wherein the presentation of data elements includes a filtered-out control configured to list and permit re-instatement of filtered-out data value display elements;
a show values UI operation mapped to the user interaction of a long press touch within the display location, wherein the updated presentation includes a presentation of one or more values associated with the data value;
a navigation from values UI operation mapped to the user interaction of a tap and hold, wherein the updated presentation includes a presentation of addition information related to the data value; and
a sorting UI operation mapped to the user interaction of swiping on an axis of a chart to sort the data value display elements, wherein the updated presentation includes sorting the data value display elements in an ascending order or a descending order depending on a direction of the swiping along the axis; and preparing, for presentation in the UI and using the UI operation on the set of data values, an updated presentation of the data values, the preparing occurring without obtaining additional data values from the server, wherein the UI operations comprise:
a compare values UI operation mapped to the user interaction of double-clicking on the display location of a first data value display element and single-clicking on the display location of a second data value display element, wherein the updated presentation includes a presentation of comparative values related to the data values corresponding to the first and second data value display elements;
a multi-value analysis UI operation mapped to the user interaction of double-clicking on the display location of a first data value display element and single-clicking on the display location of at least one second data value display element, wherein the updated presentation includes a presentation of comparative information related to the data value, and wherein single-clicking on a currently-compared data value display element causes removal, from the presentation of the comparative information, the comparative information corresponding to the clicked-on currently-compared data value display element;
a filtering UI operation mapped to the user interaction of a drag-off-screen gesture, wherein the updated presentation includes a removal of the data value display element from the presentation of the data elements, and wherein the presentation of data elements includes a filtered-out control configured to list and permit re-instatement of filtered-out data value display elements;
a show values UI operation mapped to the user interaction of a long press touch within the display location, wherein the updated presentation includes a presentation of one or more values associated with the data value;
a navigation from values UI operation mapped to the user interaction of a tap and hold, wherein the updated presentation includes a presentation of addition information related to the data value; and
a sorting UI operation mapped to the user interaction of swiping on an axis of a chart to sort the data value display elements, wherein the updated presentation includes sorting the data value display elements in an ascending order or a descending order depending on a direction of the swiping along the axis.

9. The system of claim 8, wherein the display location associated with the data value display element is a point, a line, or a region having a location relationship with the data value display element,
wherein the user interaction location is defined by a touch screen gesture performed by a user of the UI, and
wherein the UI operation is identified at least in part by mapping the user interaction location to display locations of the data value display elements.

10. The system of claim 8, wherein the UI operations comprise:
a zoom in UI operation mapped to the user interaction of an outward pinching gesture, wherein the updated presentation includes a zoomed-in presentation of the one or more data value display elements;
a zoom out UI operation mapped to the user interaction of an inward pinching gesture, wherein the updated presentation includes a zoomed-out presentation of the one or more data value display elements; and
a scroll UI operation mapped to the user interaction of a drag gesture, wherein the updated presentation includes a scrolled repositioning of the one or more data value display elements.

11. The system of claim 8,
wherein the user-selected segment is further selectable using a user selection from a legend of segments of the pie chart.

12. A non-transitory computer-readable media encoded with a computer program, the program comprising instructions that when executed by one or more computers cause the one or more computers to perform operations comprising:
receiving, by a mobile device and from a server, a set of data values;
preparing, by the mobile device for presentation in a display area of a touchscreen user interface (UI) of the mobile device, a presentation of the data values having a presentation format type and including, for each data value, a data value display element and an association between the data value display element and a display location in the display area in which the data value display element is presented, wherein the data value display element is a segment of a pie chart that presents a set of data value display elements as sectors proportioned to sum to 360 degrees of the pie chart;
providing, by the mobile device to the UI, the presentation of the data values;
receiving, by the mobile device from the UI, user interaction information identifying a user interaction with the presentation of the data values and a user interaction location in the display area in which the user interaction occurred, wherein the user interaction location is an invisible scrollable location on the pie chart, wherein the user interaction for interacting with the pie chart is scrolling the invisible scrollable location on the pie chart, and wherein the scrolling causes a rotational repositioning of the pie chart so that a user-selected segment is positioned at the top of the pie chart and a pie chart data value display element displays information for the user-selected segment that is currently positioned at the top of the pie chart;
identifying, by the mobile device and based on associations between the data value display elements and the display location in the display area in which the data value display element is included, a UI operation from a plurality of UI operations to apply to the data values, the UI operation based on the received user interaction information, the display location in the display area, and the presentation format type; and preparing, by the mobile device for presentation in the UI and using the UI operation on the set of data values, an updated presentation of the data values, the preparing occurring without obtaining additional data values from the server, wherein the UI operations comprise:

a compare values UI operation mapped to the user interaction of double-clicking on the display location of a first data value display element and single-clicking on the display location of a second data value display element, wherein the updated presentation includes a presentation of comparative values related to the data values corresponding to the first and second data value display elements; and a multi-value analysis UI operation mapped to the user interaction of double-clicking on the display location of a first data value display element and single-clicking on the display location of at least one second data value display element, wherein the updated presentation includes a presentation of comparative information related to the data value, and wherein single-clicking on a currently-compared data value display element causes removal, from the presentation of the comparative information, the comparative information corresponding to the clicked-on currently-compared data value display element;

a filtering UI operation mapped to the user interaction of a drag-off-screen gesture, wherein the updated presentation includes a removal of the data value display element from the presentation of the data elements, and wherein the presentation of data elements includes a filtered-out control configured to list and permit re-instatement of filtered-out data value display elements;

a show values UI operation mapped to the user interaction of a long press touch within the display location, wherein the updated presentation includes a presentation of one or more values associated with the data value;

a navigation from values UI operation mapped to the user interaction of a tap and hold, wherein the updated presentation includes a presentation of addition information related to the data value; and a sorting UI operation mapped to the user interaction of swiping on an axis of a chart to sort the data value display elements, wherein the updated presentation includes sorting the data value display elements in an ascending order or a descending order depending on a direction of the swiping along the axis.

13. The non-transitory computer-readable media of claim 12, wherein the display location associated with the data value display element is a point, a line, or a region having a location relationship with the data value display element, wherein the user interaction location is defined by a touch screen gesture performed by a user of the UI, and wherein the UI operation is identified at least in part by mapping the user interaction location to display locations of the data value display elements.

14. The non-transitory computer-readable media of claim 12, wherein the UI operations comprise:

a zoom in UI operation mapped to the user interaction of an outward pinching gesture, wherein the updated presentation includes a zoomed-in presentation of the one or more data value display elements;

a zoom out UI operation mapped to the user interaction of an inward pinching gesture, wherein the updated presentation includes a zoomed-out presentation of the one or more data value display elements; and a scroll UI operation mapped to the user interaction of a drag gesture, wherein the updated presentation includes a scrolled repositioning of the one or more data value display elements.

* * * * *